United States Patent
Saeger et al.

(10) Patent No.: US 9,463,583 B2
(45) Date of Patent: Oct. 11, 2016

(54) BUILDING MOLD WITH COPPER NONWOVEN

(71) Applicant: SGL CARBON SE, Wiesbaden (DE)

(72) Inventors: Helge Saeger, Lemwerder (DE); Marcus Drewes, Lemwerder (DE)

(73) Assignee: Carbon Rotec GmbH & Co. KG, Lemwerder (DE)

( * ) Notice: Subject to any disclaimer, the term of this patent is extended or adjusted under 35 U.S.C. 154(b) by 250 days.

(21) Appl. No.: 14/153,116

(22) Filed: Jan. 13, 2014

(65) Prior Publication Data

US 2014/0127345 A1    May 8, 2014

Related U.S. Application Data

(63) Continuation of application No. PCT/EP2012/060687, filed on Jun. 6, 2012.

(30) Foreign Application Priority Data

Jul. 12, 2011   (DE) .................. 10 2011 079 027

(51) Int. Cl.
   *B29C 33/02*   (2006.01)
   *B29C 33/38*   (2006.01)
   *B29C 33/40*   (2006.01)

(52) U.S. Cl.
   CPC ........... *B29C 33/02* (2013.01); *B29C 33/3828* (2013.01); *B29C 33/40* (2013.01); *B29K 2905/10* (2013.01); *B29K 2995/0013* (2013.01)

(58) Field of Classification Search
   CPC .............. B29C 33/02; B29C 33/3828; B29K 2905/10; B29K 2995/0013
   See application file for complete search history.

(56) References Cited

U.S. PATENT DOCUMENTS

| 3,387,333 A | * | 6/1968 | Irvine | ..................... B29C 33/02 165/180 |
| 3,410,936 A | * | 11/1968 | Juras | ....................... B29C 70/12 249/114.1 |
| 4,105,184 A | | 8/1978 | Sumitomo | |

(Continued)

FOREIGN PATENT DOCUMENTS

| CN | 201042833 Y | 4/2008 |
| CN | 102114681 A | 7/2011 |

(Continued)

OTHER PUBLICATIONS

International Search Report of PCT/EP2012/060687, Dated Nov. 6, 2012.

*Primary Examiner* — Robert B Davis
(74) *Attorney, Agent, or Firm* — Laurence A. Greenberg; Werner H. Stemer; Ralph E. Locher (57) ABSTRACT

A building mold for producing shaped composite materials contains at least one first surface section, which is provided for shaping the composite material, and a second surface section, which is located substantially opposite the first section and is not provided for shaping the composite material. A heating device is arranged between the two sections. At least one planar metal structure, which is in thermal contact with the first surface section, is arranged between the first surface section and the second surface section or is on the first surface section and is configured to distribute the heat given off by the heating device in a planar manner.

19 Claims, 3 Drawing Sheets

(56) References Cited

U.S. PATENT DOCUMENTS

| | | | |
|---|---|---|---|
| 4,882,118 A * | 11/1989 | Megarry | B29C 33/30 249/155 |
| 5,358,211 A | 10/1994 | Sterett | |
| 5,989,608 A * | 11/1999 | Mizuno | A21D 10/02 219/735 |
| 6,283,745 B1 | 9/2001 | Suzuki | |
| 6,309,587 B1 * | 10/2001 | Gniatczyk | B29C 33/38 249/114.1 |
| 6,499,715 B1 | 12/2002 | Furuya et al. | |
| 7,270,167 B1 * | 9/2007 | Aversenti | B22D 19/02 164/19 |
| 8,337,192 B2 * | 12/2012 | Griffith | B29C 33/3828 249/111 |
| 2010/0062099 A1 | 3/2010 | Funke et al. | |
| 2010/0140448 A1 * | 6/2010 | Koerwien | B29C 33/02 249/78 |
| 2011/0163480 A1 | 7/2011 | Herkner | |
| 2011/0198013 A1 * | 8/2011 | Christiansen | B29C 33/02 156/64 |
| 2013/0098527 A1 | 4/2013 | Harms et al. | |

FOREIGN PATENT DOCUMENTS

| | | | |
|---|---|---|---|
| DE | 2050733 A1 | 4/1972 | |
| DE | 2731535 A1 | 1/1978 | |
| DE | 3103890 C1 | 11/1982 | |
| DE | 3808363 A1 | 9/1989 | |
| DE | 10207098 A1 | 8/2003 | |
| DE | 102004042422 A1 | 3/2006 | |
| DE | 102008029058 A1 | 12/2009 | |
| DE | 202007019103 U1 | 7/2010 | |
| DE | 102010013405 A1 | 10/2011 | |
| DK | 201070038 | 12/2010 | |
| GB | 2346107 A | 8/2000 | |
| JP | H0166596 U | 4/1989 | |
| JP | 2011110719 A | 6/2011 | |
| WO | WO 2011029274 A1 * | 3/2011 | B29C 33/04 |

* cited by examiner

BUILDING MOLD WITH COPPER NONWOVEN

CROSS-REFERENCE TO RELATED APPLICATION

This is a continuation application, under 35 U.S.C. §120, of copending international application No. PCT/EP2012/060687, filed Jun. 6, 2012, which designated the United States; this application also claims the priority, under 35 U.S.C. §119, of German patent application No. DE 10 2011 079 027.6, filed Jul. 12, 2011; the prior applications are herewith incorporated by reference in their entireties.

BACKGROUND OF THE INVENTION

Field of the Invention

The present invention relates to a building mold for manufacturing shaped composite materials, which exhibits at least one first surface section provided for shaping the composite material and a second surface section lying essentially opposite the latter and not provided for shaping the composite material, as well as to a heating device arranged between them.

In particular, such composite materials are fiber-reinforced composite materials, primarily carbon and/or glass fiber-reinforced composite materials. The invention also preferably relates to a building mold for large-surface composite materials or components made out of such composite materials. Here and below, large-surface is to be understood as exhibiting at least a surface expansion of 1 m². This includes primarily the composite materials and components made thereof in the area of building components for wind power plants.

Building molds for manufacturing composite materials contain the basis for shaping in the area of composite material construction, in particular lightweight construction. They not only ensure a desired geometry, but are simultaneously also used to process the composite materials, in particular for curing the matrix formers contained therein. For example, a fiber material is added to the building mold in the area of fiber composite construction, and subsequently impregnated with resin, for example in a vacuum infusion process, and cured through thermal exposure. The manufacturing step involving impregnation can also be facilitated by using pre-impregnated material (prepreg).

In order to apply or introduce sufficient heat to the composite material to be fabricated or the fiber material impregnated with resin, the building mold usually incorporates a heating device which, when in operation, can heat the composite material or matrix former container therein enough for curing purposes. However, primarily large-surface building molds present a challenge in terms of selecting the geometry for the heating device in a way that can ensure an adequately uniform distribution of heat in the building mold.

The building molds, for example those used in the area of wind power blade construction, are sometimes provided with heating devices, which are integrated into the building mold as heating channels for guiding a heating fluid or as resistance heating wires. Such heating devices are typically permanently laminated into the building molds, which encompass glass fiber laminate or carbon fiber laminate, and can no longer be removed from the building mold composite or no longer rearranged therein without destroying the composite. If the heating devices are now operated, local heat maximums form on the surface sections provided for shaping the composite material, which contribute to a non-uniform emission of heat to the composite material to be shaped and cured. The heat maximums here usually correspond to the progression of the heating channels or that of the resistance heating wires.

However, a non-uniform emission of heat to the composite material can cause certain areas of the composite material to already be cured or stabilized, while other areas have not yet been sufficiently cured or stabilized, i.e., the quality of the composite material to be fabricated or the component consisting thereof is inadequate. In addition, introducing too much heat can damage or even destroy the composite material. When excessively high temperatures arise, a local degradation or destruction of the matrix former can also not be ruled out, which of course is important to avoid.

Known from prior art to prevent the occurrence of local heat maximums is to also laminate into the building form a mesh of carbon fibers that can achieve a suitable distribution of heat. Such a building form is known from published, Danish patent application DK 201070038 A, for example. In addition to a good electrical conductivity, carbon fibers also exhibit a satisfactory thermal conductivity, which can ensure good thermal transport primarily in the longitudinal direction of the fiber. The mesh of carbon fibers can here consist of a uniform mesh of long stretched out carbon fibers, which all exhibit a prescribed directional progression, and are mechanically joined together into a planar mesh via suitable arrangement in a fabric, for example.

However, the disadvantage to this mesh of carbon fibers on the one hand is the high cost involved in manufacturing such a carbon fiber mesh. On the other hand, the thermal conductivity of the carbon fibers is also anisotropic, since the thermal conductivity is markedly higher in the longitudinal direction of the fiber than in a direction perpendicular to the longitudinal directional progression of the fiber. This sometimes leads to a relatively slow distribution of heat given specific building mold geometries with corners and edges, or to differing thermal conductivities and a non-uniform distribution of heat in varying directions. As a consequence, however, the function of the carbon fiber mesh is not sufficiently suited for more complex component geometries.

SUMMARY OF THE INVENTION

In order to avoid the shortcomings associated with the prior art, the object here is to propose a building mold for manufacturing shaped composite materials or components made thereof. The building mold cost effectively enables a good thermal distribution of the heat from the heating device in such a way as to yield a sufficiently uniform thermal distribution of heat over a surface section, which is provided for shaping purposes and thermal emission to the composite material. In addition, as isotropic a thermal conductivity as possible is to be enabled in the surface, which can also permit a sufficiently uniform and rapid distribution of heat given more complex component geometries. In addition, a building mold is to be proposed that can be modularly expanded, but without having to modify the structure of the heating device.

In particular, the object is achieved by a building mold for manufacturing shaped composite materials, which exhibits at least one first surface section provided for shaping the composite material and a second surface section lying generally opposite the latter and not provided for shaping the composite material, as well as a heating device arranged between them. At least one planar metal structure in thermal contact with the first surface section is arranged between the first surface section and the second surface section or on the first surface section, and is configured to distribute the heat emitted by the heating device in a planar manner.

Here and below, planar must be understood to mean that the metal structure according to the invention exhibits a length expansion or width expansion that is greater than the height expansion of the metal structure. However, a planar metal structure here does not necessarily consist of planar individual parts, but rather only the overall geometry of the metal structure exhibits a planar geometry. A metal structure is also planar when it is regionally planar.

Let it further be noted that the second surface section need not correspond with the first surface section in terms of its surface expansion or geometry. Rather, it is sufficient for a boundary arranged essentially opposite the first surface section to be provided as the second surface section. In addition, this boundary can also be joined with other components or devices to form a more complex structure. The second surface section also need only be regionally planar in design.

The advantage to such a building mold on the one hand is that it allows the relatively cost-effective manufacture of planar metal structures, for example in the form of meshes, planar foams, films or nonwovens. In addition, the thermal conductivity of such metal structures is relatively isotropic, i.e., the thermal conductivity in one surface direction does not differ from the thermal conductivity in any other direction of expansion. As a consequence, even relatively complex building mold geometries can be realized, wherein an efficient distribution of heat can be ensured at the same time. In addition, the selection of metal or composition and geometry for the metal structure makes it possible to suitably adjust the magnitude of thermal conductivity itself. This adjustment process can also be facilitated by the design of the metal structure. Furthermore, such planar metal structures are more cost-effective to manufacture than carbon fiber meshes, for example.

A first preferred embodiment provides that the at least one planar metal structure encompass a metal mesh and/or metal nonwoven, in particular a copper mesh and/or a copper nonwoven. A metal mesh can here be made up of individual metal wires, which are mechanically interconnected. Such a connection can be established by weaving or braiding, for example. In like manner, the metal wires can be joined together via soldering. A metal mesh is characterized in that at least some of the metal wires assume a predetermined order relative to each other. This is not the case for a metal nonwoven, which exhibits a plurality of unordered metal wires. These unordered metal wires in a metal nonwoven can either be relatively short by comparison to the width and/or length expansion of the metal structure, i.e., exhibit less than 5% of these dimensions, preferably less than 2% of these dimensions, and especially preferred less than 1% of these dimensions, or even exhibit a percentage of relatively longer wires, i.e., in excess of 5% of these dimensions.

Such metal meshes and metal nonwovens are especially cost effective, since they can be easily manufactured, and the necessary material costs are relatively low. Copper is here especially well suited for thermal conduction, since it can exhibit a thermal conductance of between 350 W/(m·K) and 400 W/(m·k). In addition, its relative softness allows it to be readily processed and shaped by comparison to other more brittle metals.

Another embodiment can provide that the at least one planar metal structure be arranged between the first surface section and the heating device. As a consequence, the heat emitted by the heating device can be especially effectively transferred to the first surface section and distributed over its surface. As a result of the relatively low thermal resistance of the metal, the heat is thus also transferred to the first surface section relatively quickly at an especially low level of loss, so that the thermal energy can be efficiently relayed to a composite material to be shaped.

In a further embodiment of the invention, it can be provided that the at least one planar metal structure be arranged at least in direct contact with the heating device. This ensures an especially efficient thermal transfer from the heating device to the metal structure, and hence a low overall thermal resistance during thermal conduction from the heating device to the first surface section. In addition, the overall heat is more efficiently distributed in a planar manner, thereby suitably avoiding heat maximums.

According to another embodiment of the present invention, it can be provided that the at least one planar metal structure be laminated into the building mold, in particular laminated over the entire surface. A lamination process diminishes the inclusion of air bubbles and regions filled with air. However, the latter have a relatively poor thermal conductance, i.e., a relatively large thermal resistance, thereby preventing thermal transfer from the heating device to the first surface section of the building mold. Lamination is typically accompanied by an evacuation step during the lamination process, so that a tangibly diminished percentage of air is provided in the building mold after lamination. In addition, lamination permits a mechanical stabilization of the metal structure, in particular a metal mesh or a metal nonwoven.

Another aspect of the present invention provides that the at least one planar metal structure at least regionally exhibit notches. Such notches should on the one hand be relatively small by comparison to the overall expansion of the first surface section, so as not to impede a uniform thermal distribution. On the other hand, their dimensions should be large enough to enable an anchoring in the building mold, for example. As a result, a perforated lattice, or a mesh lattice consisting of metal, can be laminated into the building mold in a lamination process in such a way that the laminate matrix engages into the notches or even penetrates through the latter, thereby yielding a secure anchoring in the building mold.

In the case of a metal mesh, the notches are essentially uniform, wherein these notches can turn out to be relatively non-uniform for a metal nonwoven. Nonetheless, the two types of notches are suitable for acting as an anchor or attachment cutouts for the metal structure. However, these notches need not be configured as cutouts in their most basic form, but rather can also be configured as depressions or recesses, which can also be used as anchoring structures.

In a further development, the notches can at least regionally be openings which penetrate through at least one planar metal structure. In such a case, the metal structure can be anchored in the building mold in an especially secure and stable manner. In addition, a reduction in weight can also take place in this way, which can help markedly diminish the overall mass, in particular for very large-surface building molds, e.g., in the area of wind power blade construction. Just as the notches in general, such cutouts can be suitably distributed over the metal structure in such a way that the surface conductance for thermal distribution and the anchoring in the building mold can be specifically set.

Another embodiment of the invention can also provide that the at least one planar metal structure exhibit a uniform surface structure. This enables a largely uniform distribution of heat along with an industrially cost-effective manufacture of the metal structure. In particular for less complex building molds, a uniform surface structure also enables a sufficiently uniform anchoring of the metal structure in the building mold.

Another embodiment of the invention can also provide that the at least one planar metal structure at least regionally, in particular uniformly, exhibits openings distributed over a surface. This again permits a targeted adjustment of heat distribution along with a targeted anchoring of the metal structure in the building mold.

A further aspect can also involve having the at least one planar metal structure exhibit a surface weight of at least 500 g/m$^2$ and/or at most 2000 g/m$^2$, preferably 1700 g/m$^2$. The surface weights are sufficient for generating a suitable distribution of heat in conventional building molds, but also light enough for the building molds not to be excessively heavy in design. Precisely when using metals with a thermal conductivity exceeding 500 g/m$^2$, these surface weights are well suited for achieving an efficient distribution of heat in the building mold.

Another embodiment of the invention can also provide that the at least one planar metal structure be spaced at most 25 mm apart from the boundary surface of the first surface section. This ensures a relatively low resistance to thermal conduction between the metal structure and the first surface section, into or toward which the thermal energy is actually to be guided. Such an unnecessarily high thermal resistance can be avoided by providing a relatively small intermediate layer, primarily in a laminated building mold, which is shaped as a glass fiber or carbon fiber or mixed building mold. This relates in particular to building molds for the construction of wind power plant components.

According to a highly preferred embodiment of the present invention, it can be provided that the at least one planar metal structure be configured as a randomly oriented nonwoven. Randomly oriented nonwovens are relatively easy and cost-effective to manufacture on the one hand, and can also ensure a relatively uniform surface conductivity. In addition, randomly oriented nonwovens are very easy to drape, which is advantageous in particular when incorporating or laminating the randomly oriented nonwoven into a building mold with a more complex geometry. The randomly oriented nonwovens can also be configured with metal wires, wherein the metal wires are thin enough to be controllably cut with commercially available cutting devices.

A further aspect of the present invention or an embodiment thereof can also provide that the at least one planar metal structure at least partially exhibit several layers of metal wires arranged one over the other. Such layers are typically to be understood as independent, mechanically stable structures, which can be joined together or placed on top of each other in any number desired. The layers are here typically first fabricated individually, and then joined together or stacked atop each other in another manufacturing step. The bond can here be made detachable or permanent.

A further aspect of the present invention can also provide that the at least one planar metal structure exhibit a thermal conductivity of at least 17 W/(m·K), preferably between 350 W/(m·K) and 400 W/(m·K). This typically ensures that the thermal resistance to be surmounted in a building mold is low enough to have the transfer of heat to the first surface section be sufficiently efficient. The conductivity value also ensures a fast enough distribution of heat in the building mold during changes in the heat profile, i.e., given local or chronological changes in thermal emission by the heating device.

An embodiment can also provide that the first surface section and/or the second surface section encompass a glass fiber-reinforced and/or carbon fiber-reinforced composite material. Such composite materials enable an especially suitable integration of the planar metal structure into the building mold in a lamination process. In like manner, such molds are also suitable for use in manufacturing large-surface composite materials, for example in the area of wind power plants. According to the embodiment, the building mold can thus also be a building mold half shell for manufacturing composite components of a rotor blade in wind power plants.

An especially preferred embodiment of the invention provides that the at least one planar metal structure be encompassed by a molded part that can be isolated from the building mold. In terms of isolation, the molded part can here be detachably removed from the planar metal structure or the building mold, in particular reversibly detachably removed. As a consequence, the building mold can be modularly structured, but without having to make other changes to the heating device. Because the planar metal structure is able to achieve a thermal distribution even at relatively small temperature differences, the building mold can also be provided with attachments or molded parts, into or onto which the planar metal structure can be incorporated or placed. In addition, metals also have an advantageous thermal capacity, which makes it possible to store the transferred heat. As a result, molded parts not rigidly joined with the building mold, but rather in detachable thermal contact with the latter, are also suitable for thermal distribution.

In a further development of this embodiment, it can also be envisaged that the molded part be provided for molding reshaped composite parts, in particular for at least partially molding adhesive brackets of composite components in a rotor blade of wind power plants. As a consequence, the molded parts have not just a thermal distribution function, but also a shaping function. The detachability of the arrangement enables shape-specific adjustments without any additional problems.

The invention will be exemplarily described below based on figures. Parts with the same function are denoted with identical reference numbers on the figures. The features depicted on the figures are here claimed for the invention, whether taken in isolation or in any other combination with other features. It lies within the realm of possibility for the expert to select individual features from the following figures and combine them with an embodiment of the invention.

Other features which are considered as characteristic for the invention are set forth in the appended claims.

Although the invention is illustrated and described herein as embodied in a building mold containing a copper nonwoven, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following

DETAILED DESCRIPTION OF THE INVENTION

Figure 1:
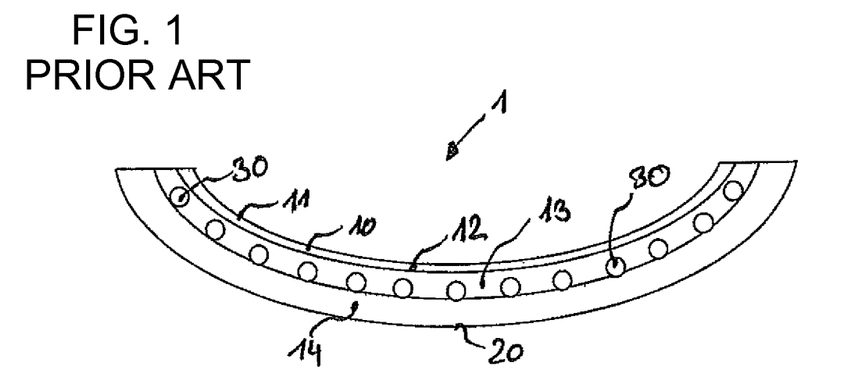
FIG. 1 is a diagrammatic, side sectional view of a building mold according to prior art.

Referring now to the figures of the drawings in detail and first, particularly to FIG. 1 thereof, there is shown an embodiment of a building mold 1 according to the prior art in a schematic sectional view from the side. The building mold 1 exhibits a first surface section 10 with a boundary surface 11 facing a composite component (not shown in any more detail). The boundary surface 11 is concave in design, and represents the approximate receiving area for a building mold 1 to manufacture a wind power plant blade. The first surface section 10 is formed by a first layer 12 of a fiber composite material, which is joined with a second layer 13 of a fiber composite material, in particular laminated or adhesively bonded. Situated inside the second layer 13 is a heating device 30, which is configured as a heating pipe system for guiding a heating fluid. The heating device can be laminated into the building mold 1 as well.

Provided on the side of the building mold 1 lying opposite the first surface section 10 is a second surface section 20, which is configured as a boundary surface for a third layer 14 of a fiber composite material. The third layer 14 of a fiber composite material is again laminated or adhesively bonded with the second layer 13 of a fiber composite material. All three layers 12, 13 and 14 form a stable building mold 1, the interior of which provides a heating device 30. The layers 12, 13 and 14 are typically configured as a carbon fiber-composite material or a glass fiber-composite material, or as a mixed composite material of both fiber types. In addition, the layers 12, 13 and 14 are here only to be understood schematically, since the individual layers need not differ in terms of their structure, and once a building mold 1 has been completely fabricated, may no longer be distinguishable from each other.

If the heating device 30 is now made operational, first the heating pipes are heated, followed by the immediately surrounding areas of the second layer 13 of a fiber composite material along with the adjacent areas of the third layer 14 of a fiber composite material. Only after a corresponding thermal conduction has been achieved are the more remote areas of the first layer 12 of a fiber composite material heated, and hence the first surface section 10.

Since the layers 12, 13 and 14 of fiber composite materials can all exhibit a relatively high thermal resistance, the heat provided in the heating pipes is not distributed over the first surface section 10 in a sufficiently planar manner, thereby resulting in heat maximums or temperature maximums thereon. These temperature maximums can be encountered on respective locations of the first surface section 10 whose surface areas exhibit the smallest distance from the central points of the heating pipe cross sections, i.e., which are arranged directly over the heating pipes.

As a consequence, however, the heat emitted over the first surface section 10 to the composite material (not shown in any more detail) is non-uniform, and can contribute to an improper curing of the composite material, specifically because certain areas are provided with clearly more thermal energy at a higher temperature than other areas. The result would be that either the areas oversupplied with thermal energy will exhibit disruptions or undesired changes, or other, relatively undersupplied areas will not be adequately cured.

Figure 2A:
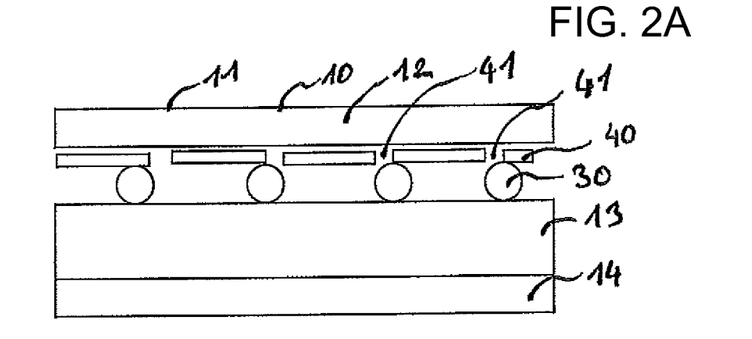
FIG. 2A is a diagrammatic, side sectional view through the building mold, in a detailed view corresponding to an embodiment according to the invention.

As a precaution against these undesired results, an embodiment of the building mold according to the invention of FIG. 2A envisages that a planar metal structure 40 be provided between the first layer 12 and second layer 13 of fiber composite materials, which here consists of a number of substructures in cross section. These substructures are metal strips, which are joined together. The representation shown is an exploded sketch, which makes it possible to better depict the individual components. In particular, it can be more easily discerned that the metal structure 40 is planar in design before being integrated into the building mold 1. Integration takes place by draping the planar metal structure 40 around the pipes of the heating device 30, and laminating the second layer with the first layer 12 of a fiber composite material.

As denoted in FIG. 2A, each pipe of the heating device 30 is in contact with the planar metal structure 40, and can thus relay thermal energy directly to the metal structure 40. The heat is redistributed inside the metal structure 40, so that the thermal energy is initially distributed over a large area of the planar metal structure 40 through thermal conduction, and then introduced into the first layer 12 of a fiber composite material. When thermal energy exits the first surface section 10 for thermal transfer to the composite material (not shown in any more detail), the planar distribution of heat is thus homogenized, so that the heat maximums or temperature maximums can be largely avoided, or tangibly diminished in terms of their relative intensity.

Figure 2B:
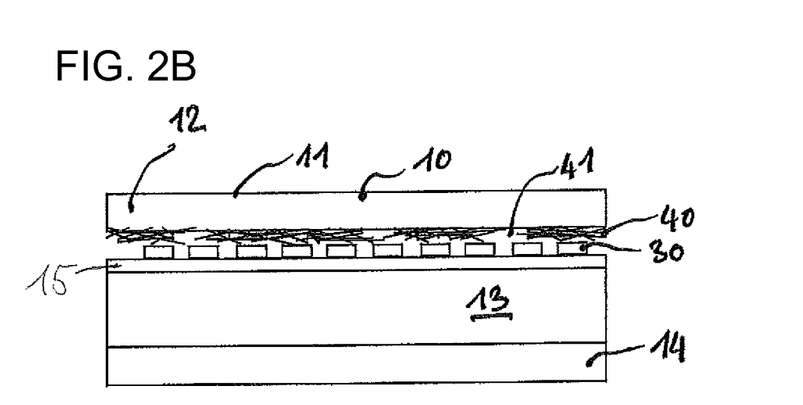
FIG. 2B is a side, sectional view through the building mold, in a detailed view corresponding to another embodiment of the present invention.

FIG. 2B shows another embodiment of the present invention in a schematic sectional view from the side. The embodiment depicted in FIG. 2B differs from the embodiment in FIG. 2A in that another layer 15 of a fiber composite material is provided, which is situated between the first layer 12 and the second layer 13 of fiber composite materials. The additional layer 15 of fiber composite materials has arranged upon it the electric heating device 30, which consists of a number of resistance heating wires or resistance heating bands. Arranged between the heating device 30 and the first layer 12 of fiber composite material is a metal nonwoven, in particular a copper nonwoven, which performs the function of the planar metal structure 40, i.e., ensures a planar distribution of heat during operation of the heating device 30.

As in the embodiment according to FIG. 2A, the metal structure 40 is provided with notches in the embodiment according to FIG. 2B, which allow resins or adhesives to penetrate in and even through, so that a direct resin bridge can be formed between the first layer 12 and the other layer 15 or the second layer 13. This direct connection makes it possible to securely integrate the planar metal structure 40 into the building mold 1 on the one hand, and also allows good penetration through the planar metal structure 40 so as to avoid undesired air bubbles. At the same time, the overall weight of the planar metal structure 40 is reduced while leaving the thermal distribution capacity largely undiminished.

In the case of metal nonwovens, adhesive or resin can also be made to pass through the planar metal structure 40 by having the resin or adhesive penetrate into and through the openings between the individual copper wires. As a consequence, notches 41 do not even have to be provided if the metal nonwoven is not too dense. In conventional metal nonwovens, penetrability is sufficient to allow common industrial adhesives or resins to pass through the nonwoven in a laminating process.

Figure 3A:
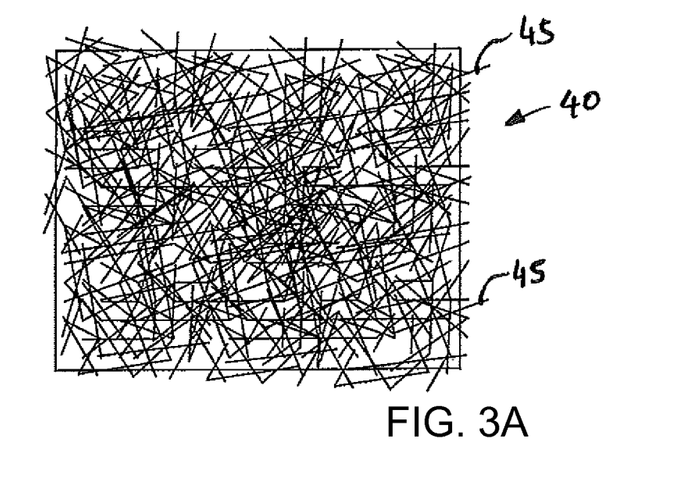
FIG. 3A is a top plan view of an embodiment of a randomly oriented nonwoven according to the invention as a planar metal structure.

FIG. 3A presents a schematic top view of a metal nonwoven of this type. The metal nonwoven encompasses a plurality of individual metal wires 45, which are short by comparison to the depicted width expansion or length expansion of the nonwoven. This stands in contrast to the metal mesh shown on FIG. 3B, which contains a number of metal wires 45 that run along a straight line, and are spaced apart at uniform distances from each other in the width expansion. In the length expansion depicted, a number of similar metal wires 45 are again spaced the same apart from each other, wherein these wires are joined with the metal wires 45 spaced apart in the width expansion direction for this purpose. Joining takes place at the intersections by soldering.

Figure 3B:
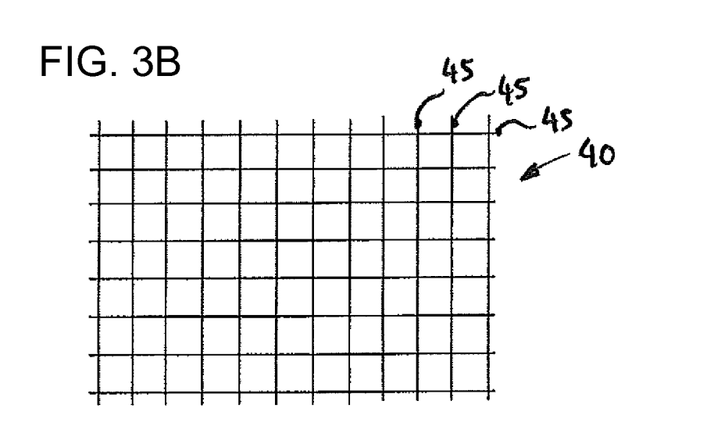
FIG. 3B is a top plan view of an embodiment of a metal mesh according to the invention as a planar metal structure.

The contact points of the individual metal wires 45 in the two arrangements shown in FIGS. 3A and 3B are sufficient for thermal energy to be transferred very efficiently from one metal wire 45 to the next. As a consequence, a more uniform distribution of heat is achieved when introducing thermal energy to a limited area of one of these planar metal structures 40. Since both planar metal structures 40 exhibit a number of openings 41, these metal structures 40 are especially well suited for lamination in one embodiment of a building mold 1 according to the invention.

Figure 4A:
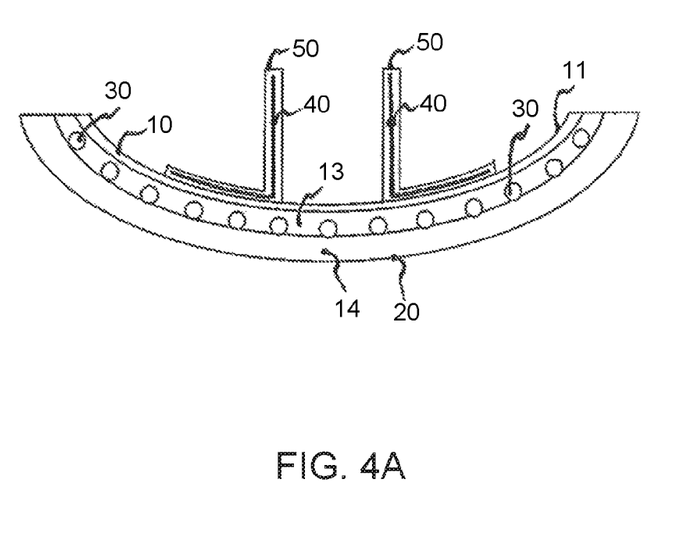
FIG. 4A is a side, sectional view through the building mold with two isolatable molded parts corresponding to an embodiment of the present invention.

FIG. 4A presents a schematic sectional view from the side through the building mold 1 with two isolatable molded parts 50 corresponding to an embodiment of the present invention. The embodiment according to FIG. 4A here differs from the one known from prior art according to FIG. 1 only in that two molded parts 50 exhibiting an angular sectional shape are provided on the first surface section 10. The one respective leg of the molded parts 50 is here shaped in such a way as to abut positively against the first surface section 10 in a planar manner. By contrast, the other legs are shaped and arranged in such a way as to present a perpendicular boundary, which is upwardly directed in the orientation shown. The two molded parts 50 each exhibit at least two planar metal structures 40, which are laminated into the molded parts 50. In the present case, the planar structures are angularly laminated as a single piece into the molded parts 50.

If the heating device 30 of the building mold 1 is now made operational, the planar metal structures 40 are heated through indirect thermal contact with the heating device 30. Sections of the planar metal structures 40 arranged in a planar manner on the first surface section 10 are here heated first. However, thermal conduction in the planar metal structure 40 then also heats up those areas of the planar metal structures 40 that are upwardly oriented in the arrangement shown. If a composite material to be shaped or heated is situated between the two legs of the molded parts 50 that are not tightly fit with the first surface section 10, these legs can emit enough heat for curing the composite material. As a consequence, both these legs and a section of the first surface section 10 are used in shaping.

The invention claimed is:

1. A building mold for manufacturing shaped composite materials, the building mold comprising:
    at least one first surface section for shaping a composite material;
    a second surface section lying generally opposite said first surface section and not provided for shaping the composite material;
    a heating device disposed between said first and said second surface sections; and
    at least one planar metal structure in thermal contact with said first surface section, said at least one planar metal structure at least regionally having notches, said planar metal structure one of disposed between said first surface section and said second surface section or on said first surface section, said planar metal structure distributing heat emitted by said heating device in a planar manner.

2. The building mold according to claim 1, wherein said at least one planar metal structure has at least one of a metal mesh or a metal nonwoven.

3. The building mold according to claim 1, wherein said at least one planar metal structure is disposed between said first surface section and said heating device.

4. The building mold according to claim 1, wherein said at least one planar metal structure is laminated into the building mold.

5. The building mold according to claim 1, wherein said at least one planar metal structure at least regionally has openings formed therein and distributed over a surface.

6. The building mold according to claim 1, wherein said at least one planar metal structure has a surface weight of at least 500 g/m$^2$ and at most 2000 g/m$^2$.

7. The building mold according to claim 1, wherein:
    said first surface section has a boundary surface; and
    said at least one planar metal structure is spaced at most 25 mm apart from said boundary surface of said first surface section.

8. The building mold according to claim 1, wherein said at least one planar metal structure is a randomly oriented nonwoven.

9. The building mold according to claim 1, wherein said at least one planar metal structure at least partially has several layers of metal wires disposed one over the other.

10. The building mold according to claim 1, wherein said at least one planar metal structure has a thermal conductivity of at least 17 W/(m·K).

11. The building mold according to claim 1, wherein at least one of said first surface section or said second surface section is formed from at least one of a glass fiber-reinforced composite material or a carbon fiber-reinforced composite material.

12. The building mold according to claim 1, wherein said first surface section, said second surface section, said heating device and said planar metal structure define a building mold half shell for manufacturing composite components of a rotor blade for wind power plants.

13. The building mold according to claim 1, further comprising a molded part containing said planar metal structure and can be isolated from other parts of the building mold.

14. The building mold according to claim 13, wherein said molded part is provided for molding reshaped composite parts.

15. The building mold according to claim 1, wherein said at least one planar metal structure encompasses at least one of a copper mesh or a copper nonwoven.

16. The building mold according to claim 1, wherein said at least one planar metal structure has a surface weight of 1700 g/m$^2$.

17. The building mold according to claim 1, wherein said at least one planar metal structure has a thermal conductivity of between 350 W/(m·K) and 400 W/(m·K).

18. The building mold according to claim 13, wherein said molded part is provided for at least partially molding adhesive brackets of composite components in a rotor blade of wind power plants.

19. The building mold according to claim 1, wherein said at least one planar metal structure is laminated over an entire surface.

* * * * *